United States Patent
Dewey et al.

(10) Patent No.: US 8,180,402 B2
(45) Date of Patent: May 15, 2012

(54) CONTROL SYSTEMS HAVING A SIM FOR CONTROLLING A COMPUTING DEVICE

(75) Inventors: Roger D. Dewey, Raleigh, NC (US); Michael C. Heath, Cary, NC (US); Ian L. Johnson, Apex, NC (US)

(73) Assignee: Able Device, LLC, Raleigh, NC (US)

( * ) Notice: Subject to any disclaimer, the term of this patent is extended or adjusted under 35 U.S.C. 154(b) by 0 days.

(21) Appl. No.: 13/047,612

(22) Filed: Mar. 14, 2011

(65) Prior Publication Data

US 2011/0223971 A1    Sep. 15, 2011

Related U.S. Application Data

(60) Provisional application No. 61/313,722, filed on Mar. 13, 2010.

(51) Int. Cl.
*H04M 1/00*   (2006.01)
*H04B 1/38*   (2006.01)
(52) U.S. Cl. ............... 455/558; 455/550.1; 455/557
(58) Field of Classification Search .......... None
See application file for complete search history.

(56) References Cited

U.S. PATENT DOCUMENTS

| | | | |
|---|---|---|---|
| 6,714,799 B1 * | 3/2004 | Park et al. | 455/558 |
| 7,218,915 B2 * | 5/2007 | Craven | 455/411 |
| 2004/0030761 A1 | 2/2004 | Takeuchi | |
| 2005/0096087 A1 * | 5/2005 | Kim | 455/558 |
| 2007/0169107 A1 | 7/2007 | Huttunen | |
| 2009/0191919 A1 * | 7/2009 | Kawamura | 455/558 |
| 2010/0057485 A1 | 3/2010 | Luft | |
| 2011/0223971 A1 * | 9/2011 | Dewey et al. | 455/558 |

OTHER PUBLICATIONS

PCT Search Report of Nov. 23, 2011 for corresponding PCT Application No. PCT/US2011/028404.

* cited by examiner

*Primary Examiner* — Ajit Patel
(74) *Attorney, Agent, or Firm* — Olive Law Group, PLLC

(57) ABSTRACT

A system and associated method are provided. The system includes a subscriber identification module (SIM) comprising a memory configured to store one or more executable instructions and a processor configured to execute the one or more executable instructions for controlling a device, a device configured for being controlled by the SIM, and a SIM interface configured to communicate the instructions from the SIM to control the device.

24 Claims, 5 Drawing Sheets

CONTROL SYSTEMS HAVING A SIM FOR CONTROLLING A COMPUTING DEVICE

PRIORITY CLAIM

This application claims priority to U.S. Provisional Patent Application No. 61/313,722 filed on Mar. 13, 2010, the entire contents of which are hereby incorporated by reference.

FIELD OF THE INVENTION

The present invention relates to a control system having a subscriber identification module, and more particularly, towards a control system having a subscriber identification module that is configured for storing instructions for controlling a device.

BACKGROUND OF THE INVENTION

Machine-to-Machine (M2M) refers to data communications between machines. M2M is most commonly translated to Machine-to-Machine but has sometimes been referred to as Man-to-Machine, Machine-to-Man, Machine-to-Mobile, and Mobile-to-Machine. Among mobile telephone service providers, M2M means Mobile-to-Mobile, and is used to describe calls that do not involve land lines.

A typical M2M system may include a device or group of devices capable of replying to requests for data contained within those devices or capable of transmitting data contained within those device autonomously. Additionally, a typical M2M system may include a communications link to connect the device or group of devices to a computer server or another device such as an Ethernet, telephony, or wireless device such as a wireless cellular or internet network. In instances of using a cellular network, a connected device platform may be included to manage communications such as service activations, provisioning, usage controls, fraud management, and cost management. Additionally, a typical M2M system may include a software agent, process, or interface by which the data can be analyzed, reported, and/or acted upon. Also, a typical M2M system may include instructions for providing instructions for the device or groups of devices.

Various M2M systems are task-specific as they are configured for use with a specific device or small subgroup of devices. M2M systems may be employed in a variety of applications including, but not limited to, enterprise infrastructure management, data centers, monitoring in the energy industry, manufacturing, facility management, transportation, healthcare, insurance, fleet management, time and attendance applications, sensor networks, vending machines, building and home automation systems, security systems, and unified platforms.

Subscriber identification module (SIM) technology may be used to securely store data such as the International Mobile Subscriber Identity (IMSI) used to identify a subscriber on mobile telephony devices, such as mobile phones and computers. Multiple SIM cards may be used in combination on a single device to accomplish specific service functions over a wireless communications link. In these scenarios, a second SIM card is needed to provide processor power to accomplish a particular service using a mobile phone and a dedicated server to provide extensions of service between the mobile phone user and external servers.

In another application of SIM technology, AT commands are encapsulated within an existing SIM Application Toolkit dialog in order to use a telemetry module (i.e., a modem) as a pass-through in order to control externally connected devices such as a display, keypad, or similar phone like function. This system uses manufacturer specific commands available only on a particular manufacturer's module; however, the system requires an externally connecting computing device to interpret these commands and respond with the intended control. This pass-through technique only uses the modem as the pass-through of SIM generated control commands passed to external equipment. The SIM interface is connected to this modem and not directly to the controlled machine. This requires that the system contains a SIM, a telemetry module, and a processing unit in order to provide control of an externally controlled device.

In the above-described applications of SIM technology, SIM or SMART SIM are used as the logic processing unit which communicates with devices connected to a telemetry modem and make use of the SIM's processing power to control the operation of a wireless remote device. These devices may interface to an external server or a subsequently linked device such as a man-machine device including a keypad or display using the extensions of published functions as provided by the SIM Application Toolkit, however, these techniques require any subsequently linked device to contain another processor for interpreting AT commands or the like to perform a man-machine control functions. Additionally, the processor program resident on the SIM is specifically used for one particular type of modem which supports the passing of commands through the modem to the other subsequently connected devices. These techniques require other connected devices to process the commands to accomplish machine control and are not effective to improve system cost, size, and power drain. Therefore, it is desired to provide improvements to SIM-based systems for controlling machine devices.

SUMMARY

An exemplary objective of the present invention is to provide a machine control system for controlling any subsequently connected device, such as a machine, meter, control valve, sensor, data acquisition system, or similar device employing a wireless modem used for remote monitoring of a machine using a SIM or SMART SIM containing the processing logic to control machine functions with minimal system components. Embodiments of the present invention allow a logic program to reside on the SIM card. The logic program may contain a function to control the operation of the input and output control lines of a wireless modem, as well as logic for controlling the wireless function of the modem. The present invention eliminates the need of a processor between the modem and machine by having the logic reside in the modem to receive the SIM commands, therefore providing direct access to the control lines, and ultimately, the subsequently-linked device.

According to one or more embodiments of the present invention, M2M (machine-to-machine) applications specific to machine control on the SIM are provided As a result, a common set of control functions are provided which can be selected to accomplish machine control and command functions without the need for custom logic design for common machine control and status reporting.

According to one or more embodiments of the present invention, SIM-based control functions are provided to control machine devices that may not be wireless. The machine may contain, or may be connected to, a device that can interface to a SIM containing the provisions of this invention in order to provide the machine control functions, i.e. non-wireless controllers.

According to one or more embodiments of the present invention, the disclosed system facilitates updating the control logic residing on the SIM by simply replacing the SIM card which contains the updated code. Field updates can be accomplished by replacement of the SIM for a convenient change of controller software. Changes can also be made to the processor code using over the air (OTA) update methods. Another advantage in updating the SIM, rather than machine or modem processor code, is that these updates are not tied to the modem or machine processor's specific requirements for a particular manufacturer.

Furthermore, by having the machine control functions reside on the SIM, a carrier or service provider service is more readily enabled to provide field units with wireless functional upgrades and/or services from the telemetry service provider. Examples include, but are not limited to, cellular-provided Global Positioning Systems (GPS), and Internet Protocol (IP) addresses, as well as specific services such as capacity changes and servers.

To enable a system according to one or more embodiments of the disclosed subject matter, additions to the operational control code of presently manufactured telemetry modules (or any external machine processors if modems are not used) may be needed in order to accept the SIM-based machine specific applications to permit access to the telemetry module's input and output control lines. These control lines are presently controlled by AT commands on existing modems and embedded processor modules. However, existing control lines presently suffer from the restriction of having a particular set and structure for the selected AT commands, which makes the processor commands specific to the particular modem manufacturer's command structure. Also, the commands are customarily generated by external processing units and received by the modem through a serial interface from an externally connected processor. One or more embodiments of the disclosed subject matter allows for SIM applications to access the modem's or module's control lines directly from SIM generated commands. This addition thereby allows transportability of the SIM control functions to any module containing the module's advanced commands.

Furthermore, by application of a system or method according to one or more embodiments of the disclosed subject matter, since elimination of an external processor located between the machine and the modem may be possible, the cost, size, and power drain of the system is reduced. The subject matter disclosed herein may further eliminate the need for control programs to reside on a modem where the manufacturer allows logic programming on the modem, commonly referred to as "embedded modems" in the M2M industry. Therefore, with the implementation of a system according to one or more embodiments of the disclosed subject matter, external processors that issue AT commands over a serial port may be eliminated leaving only the SIM and modem combination as the only necessary components to perform machine control. The system according to one or more embodiments of the disclosed subject matter may apply to both wireless and non-wireless systems which include, but is not limited to, Cellular, ZigBee, LPR (Low Power Radio), RFID (Radio-frequency Identification), Infrared, Bluetooth, WiFi (Wireless Fidelity), and other licensed and un-licensed wireless services as well as wired connection incorporating USB, serial, parallel, RS232, Ethernet, or similar connection schemes. The control lines also include connection to the external devices using both the above mentioned wireless and non-wireless connection techniques.

These and other objects are achieved according to one or more embodiments of the disclosed subject matter in which a system is provided. The system includes a subscriber identification module (SIM) that has a memory configured to store one or more executable instructions and a processor configured to execute the one or more executable instructions to generate one or more commands for controlling a device. A SIM interface is configured to communicate the one or more commands from the SIM to the device for controlling the device.

According to one or more embodiments, a device is configured for being controlled by the SIM.

According to one or more embodiments, the device is a machine-to-machine (M2M) device.

According to one or more embodiments, the SIM interface is configured to provide power to the SIM at predetermined intervals.

According to one or more embodiments, the one or more executable instructions include one or more instructions for determining the predetermined intervals.

According to one or more embodiments, the one or more executable instructions comprise one or more executable instructions for determining whether a message has been received from the SIM interface, and the SIM is configured to execute the one or more executable instructions for determining whether the message has been received from the SIM.

According to one or more embodiments, the message is a text message.

According to one or more embodiments, the message is in a binary format.

According to one or more embodiments, the SIM is configured to execute the executable instructions to generate one or more commands to control the device in response to determining whether a message has been received from the SIM interface.

According to one or more embodiments, the SIM interface is configured to receive additional executable instructions from a network for updating the instructions of the SIM, and the SIM interface is configured to communicate the additional executable instructions to the SIM.

According to one or more embodiments, the SIM interface includes a processor configured to communicate the commands from the SIM to control the device.

According to one or more embodiments, the SIM interface includes an input/output (I/O) module configured to communicate the commands from the SIM to control the device.

According to one or more embodiments, the system includes lines communicatively connecting the I/O module and the device.

According to one or more embodiments, lines communicatively connect the I/O module and the SIM.

According to one or more embodiments, the SIM interface is communicatively coupled to the SIM via a cellular network.

According to one or more embodiments, the executable instructions include computer-executable instructions.

According to one or more embodiments, a method is provided. The method includes at a SIM, executing one or more executable instructions to generate one or more commands for controlling a device, and at a SIM interface, receiving the one or more commands for controlling the device, and communicating the one or more commands to the device for controlling the device.

According to one or more embodiments, the method may include providing power to the SIM at predetermined intervals.

According to one or more embodiments, the executable instructions include an executable instruction for determining whether a message has been received from the SIM interface, and the method further includes executing the executable instruction for determining whether the message has been received from the SIM interface.

According to one or more embodiments, the method includes executing the one or more executable instructions to generate the one or more commands to control the device in response to executing the executable instruction for determining a registration status of the SIM interface.

According to one or more embodiments, the method includes receiving additional executable instructions from a network for updating the instructions of the SIM, and communicating the additional executable instructions to the SIM.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION OF THE INVENTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
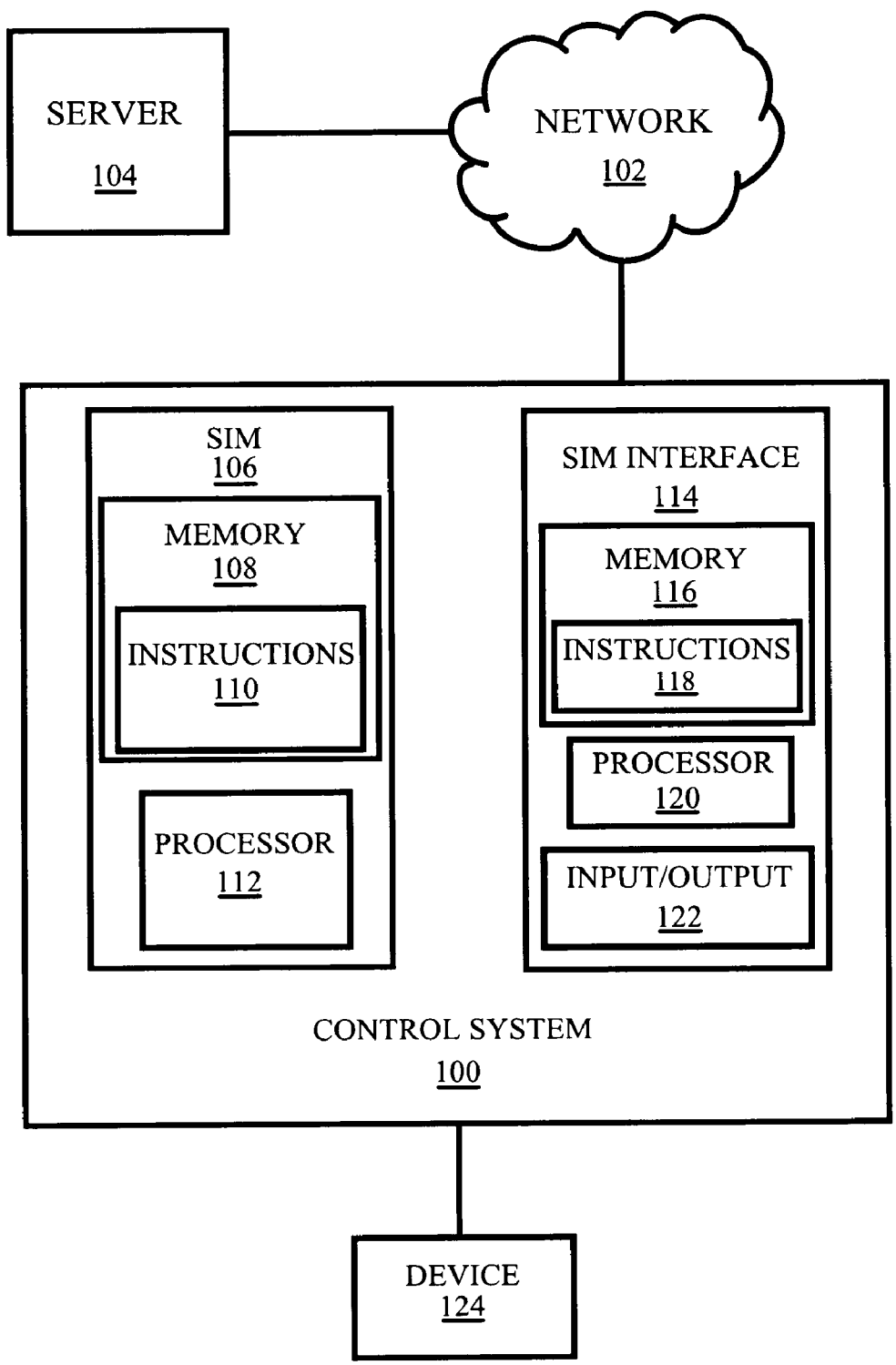
FIG. 1 sets forth a schematic diagram of a system for use with a SIM for controlling a device in accordance with one or more embodiments of the present invention.

FIG. 1 illustrates a system for use with a subscriber identity module or subscriber identification module (SIM) for controlling a device. As illustrated in FIG. 1, a control system 100 may be provided. Control system 100 may be in communication with a network 102. Control system 100 and network 102 may be in wired or wireless communication. Network 102 may also be in communication with a server 104. Network 102 may be in wired or wireless communication with server 104. Server 104 may be any appropriately configured server, such as, for example, a computer program running as a service, a physical computer dedicated to running one or more services, or a software or hardware system such as a database, file, mail, or print server.

The control system 100 may include a SIM 106. As used herein, a SIM 106 may refer to a removable module configured for communicating with electronic devices. The SIM 106 may include subscriber information as is conventionally found in SIM cards. The SIM 106 may include memory 108 provided for storing one or more executable instructions 110. As used herein, one or more instructions may be one or more computer-executable instructions. The memory 108 may be random-access memory such as dynamic random-access memory, and in one or more embodiments, may also be read-only memory or flash memory. The SIM 106 may further include a processor 112 that is configured for executing the one or more executable instructions 110 to generate control commands for controlling a device. The processor 112 may be a processor found on conventional SIM cards, or may, in one or more embodiments, be a processor that is installed upon a SIM card as an add-on feature.

The control system 100 may include a SIM interface 114 that is communicatively coupled to the SIM 106. The SIM interface 114 may be communicatively coupled to the SIM 106 by a Universal Serial Bus (USB) connection, a serial or parallel connection, RS-232 connectors, Ethernet, and the like. Additionally, the SIM interface 114 may be communicatively coupled to the network 102 or server 104 via cellular communication methods and devices that may include a receiving antenna. The SIM interface 114 may include memory 116 for storing one or more executable instructions 118. Additionally, the SIM interface 114 may include a processor 120 for communicating the commands generated by the SIM 106. The SIM interface 114 may also include an input/output (IO) module 122 for communicating controls and commands with the network 102 and a device 124. The I/O module 122 may be any hardware, software, firmware, or combinations thereof that are configured to communicate commands from the SIM 106 or SIM interface 114 to the device 124.

The device 124 may be any appropriately configured device, and in one or more embodiments, may be a machine-to-machine (M2M) device. The device 124 may be in wired or wireless communication with the control system 100, network 102, and server 104, and this communication may occur through a modem or other telemetry device.

The SIM 106 may be further configured to communicate with the SIM interface 114 in response to receiving a text message. The text message may include a Short Message Service (SMS) or a Multimedia Message Service (MMS), while, in one or more embodiments, may include a binary-based numerical system. As a non-limiting example according to one or more embodiments of the disclosed subject matter, the text message may be received by any of the SIM 106, SIM interface 114, or device 124. The processor 112 of the SIM 106 executes the one or more executable instructions 110 to generate one or more commands in response to receiving a text message by one of the SIM 106, SIM interface 114, or device 124. In one or more embodiments, the SIM interface 114 may be configured to receive a text message. The SIM interface 114 transmits power to the SIM 106 to power the SIM 106 and communicate the text message to the SIM 106. The SIM interface 114 may transmit power to the SIM 106 constantly, or, in one or more embodiments, may transmit power to the SIM 106 at predetermined intervals or in response to receiving a text message. The SIM 106 and/or SIM interface 114 may comprise one or more executable instructions for determining the predetermined intervals. The text message may be sent via the network 102 from an external control device. In one or more embodiments, the text message may be sent via the network 102 from the device 124.

The system 100 is configured such that the SIM 106 may communicate commands to the SIM interface 114 and device 124 without the need for an external processor. The SIM interface 114 may, however, include processor 120 for interpreting the commands received from the SIM 106 to control the device 124. In this manner, the SIM 106 comprises the executable instructions 110 and processor 112 configured to generate commands for controlling device 124 and may be used with any interface capable of interpreting commands received from the SIM 106. This creates a reduction in system components, and therefore a decrease in size, cost, and power consumption of conventional control systems.

By storing the executable instructions 110 on the memory 108 of the SIM 106, replacement and/or update of the executable instructions 110 can be easily accomplished. For example, replacement can be accomplished by replacing the SIM 106. Further, updating of the executable instructions may be accomplished by writing updated executable instructions to the memory 108 of the SIM 106, or by uploading updated executable instructions to the memory 108 by communications received from the network 102.

In one or more embodiments, the SIM 106 may be in wired or wireless communication with the network 102 and server 104. In one or more embodiments, the wireless communication may be via one of a cellular service, ZigBee, low power radio (LPR), radio-frequency identification (RFID), infrared, Bluetooth, wireless fidelity (Wi-Fi), or similar.

Figure 2:
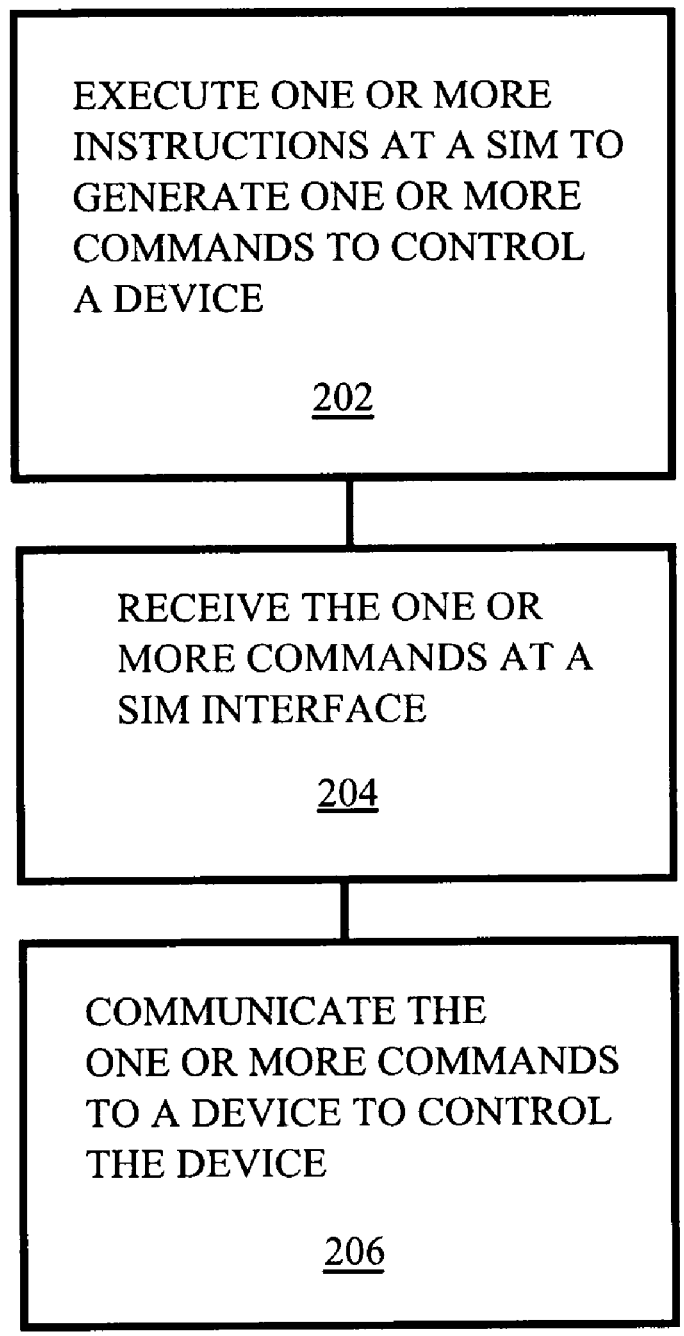
FIG. 2 is a flow chart depicting one or more methods according to one or more embodiments of the disclosed subject matter.

A flow chart depicting a method (step 200) according to one or more embodiments of the disclosed subject matter is shown in FIG. 2. As illustrated, the method (step 200) may include executing one or more executable instructions at a SIM (step 202). The method (step 200) may also include receiving one or more executable instructions to generate one or more commands to control a device at a SIM interface (step 204). The method (step 200) may also include communicating the one or more commands at the SIM interface to a device for controlling the device (step 206).

Figure 3:
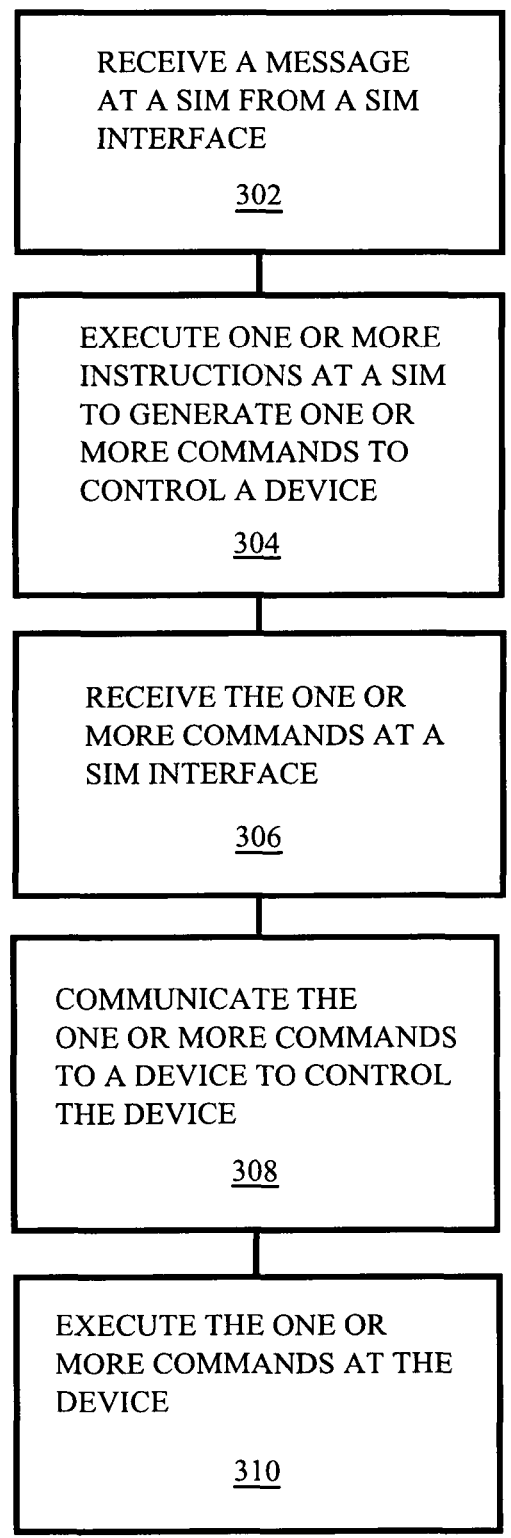
FIG. 3 is a flow chart depicting one or more methods according to one or more embodiments of the disclosed subject matter.

A flow chart depicting a method (step) 300 according to one or more embodiments of the disclosed subject matter is shown in FIG. 3. As illustrated, the method (step 300) may include receiving a message at a SIM from a SIM interface (step 302). The method (step 300) may include executing one or more executable instructions at a SIM (step 304) to generate commands for controlling a device. The method (step 300) may also include receiving the one or more commands at a SIM interface (step 306). The method (step 300) may also include communicating the one or more commands at the SIM interface to a device for controlling the device (step 308). The method (step 300) may include executing the one or more commands at the device (step 310).

Figure 4:
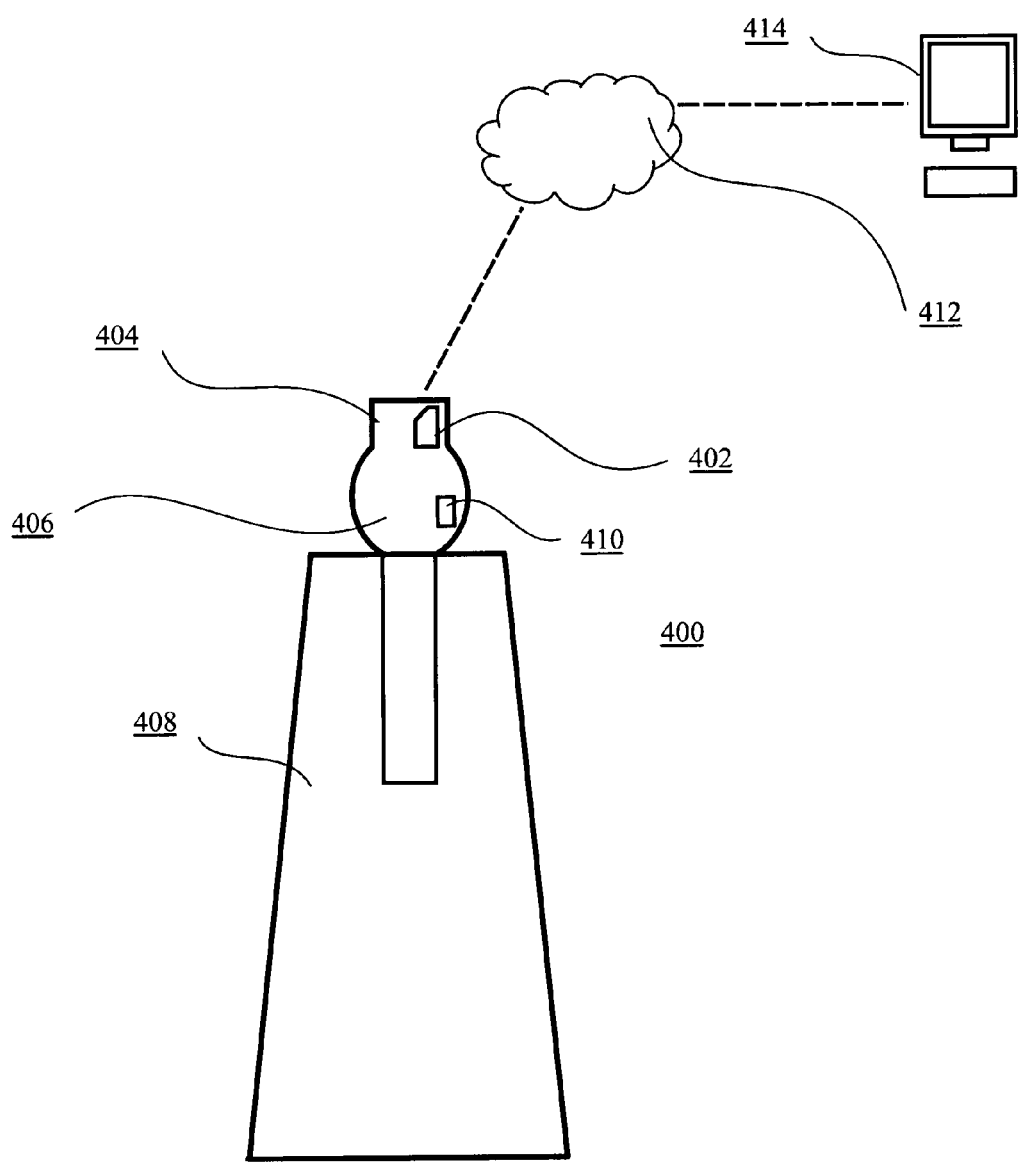
FIG. 4 is a schematic view depicting one or more systems according to one or more embodiments of the disclosed subject matter.

An illustrative example of a system according to one or more embodiments of the disclosed subject matter is depicted in FIG. 4 in which a system is generally designated as 400. The system 400 includes a SIM 402 that is communicatively coupled to a SIM interface 404. The SIM interface 404 is communicatively coupled to a device 406, which in the one or more embodiments illustrated in FIG. 4, is a pump for pumping water from a tank 408. The device 406 may further include a sensor 410 that is configured to determine desired operating parameters of the pump or tank 408. The SIM interface 404 may be configured to communicate the operating parameters from the sensor 410 to a network 412 through wired or wireless communication. The network 412 may be communicatively coupled to a computing device, such as a personal computer 414, which is configured for displaying graphical indicia representing any of desired information about the operation of the system 400, and may also be configured to receive user-input commands and communicate the user-input commands to the SIM 402 through the network 412.

According to one or more embodiments, in a non-limiting illustrative example, the SIM 402 comprises executable instructions to determine the fluid level of liquid sensed by sensor 410. The sensor 410 may be configured to communicate a liquid level to the SIM 402. The SIM 402 then executes the executable instructions to generate a command that the SIM interface 404 then communicates to the device 406, which in the one or more embodiments depicted in FIG. 4, is a pump. The personal computer 414 may be communicatively coupled to the SIM interface 404 and configured to display indicia representative of operating conditions of the SIM 402, SIM interface 404, and device 406.

Figure 5:
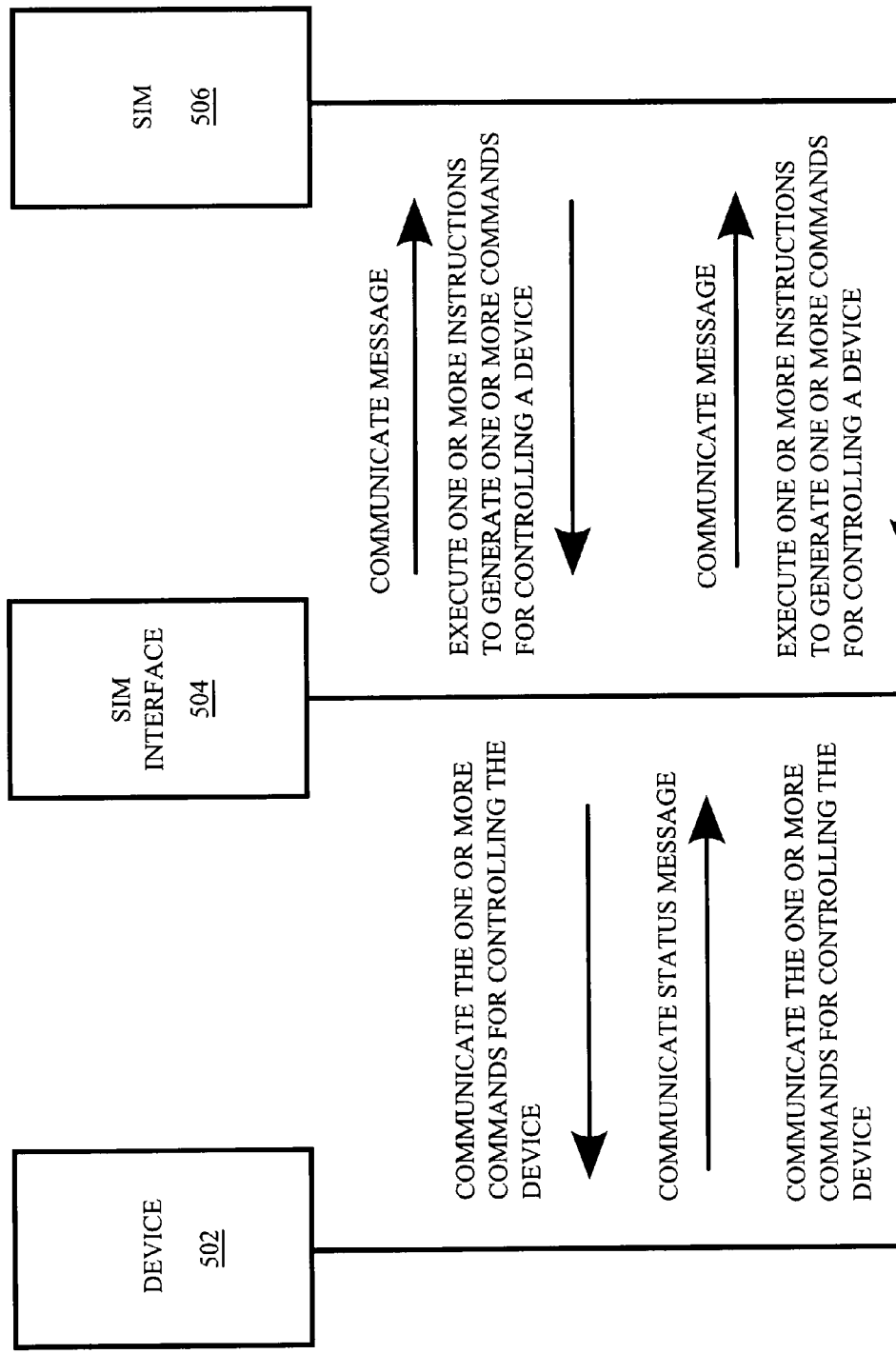
FIG. 5 is a message flow diagram depicting one or more systems according to one or more embodiments of the disclosed subject matter.

A system 500 according to one or more embodiments of the disclosed subject matter is illustrated in the flow diagram in FIG. 5. The system 500 includes a device 502, a SIM interface 504 communicatively coupled to the device 502, and a SIM 506 communicatively coupled to the SIM interface 504. The SIM interface 504 may communicate a message, such as a text message, to the SIM 506. Additionally, the SIM interface 504 may communicate any other appropriate message or manner of communication, including, for example, an I/O status such as a level sensor similar to that which is described in regards to system 400. In response to receiving the message from the SIM interface 504, the SIM 506 executes one or more executable instructions to generate one or more commands and communicates the one or more commands to the SIM interface 504. In response to receiving the one or more commands from the SIM 506, the SIM interface 504 communicates the one or more commands to the device 502 to control the device. The device 502 communicates status messages to the SIM interface 504. For example, an illustrative example similar to that which is disclosed in regards to FIG. 4 includes a status message indicative of the liquid level of a tank, where the device 502 is a pump for pumping liquids. After receiving a status message from the device 502, the SIM interface 504 communicates a message, such as a text message, to the SIM 506. The process of executing the one or more instructions to generate one or more commands may then be repeated. This process may occur at predetermined intervals or may occur when the device 502 has a triggering event to trigger a status message.

Various techniques described herein may be implemented with hardware or software or, where appropriate, with a combination of both. Thus, the methods and apparatus of the disclosed embodiments, or certain aspects or portions thereof, may take the form of program code (i.e., executable instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
    a subscriber identification module (SIM) comprising a memory configured to store one or more executable instructions and a processor configured to execute the one or more executable instructions to generate one or more commands for controlling a device;
    a SIM interface configured to communicate the one or more commands from the SIM to the device for controlling the device;
    wherein the one or more executable instructions stored on the SIM comprise one or more executable instructions for determining whether a message has been received from the SIM interface, and
    wherein the SIM is configured to execute the one or more executable instructions for determining whether the message has been received from the SIM interface for controlling the device.

2. The system of claim 1, further including a device configured for being controlled by the SIM.

3. The system of claim 2, wherein the device is a machine-to-machine (M2M) device.

4. The system of claim 1, wherein the SIM interface is configured to provide power to the SIM at predetermined intervals.

5. The system of claim 4, wherein the one or more executable instructions comprise one or more instructions for determining the predetermined intervals.

6. The system of claim 1, wherein the message is a text message.

7. The system of claim 1, wherein the message comprises a binary format.

8. The system of claim 1, wherein the SIM is configured to execute the executable instructions to generate one or more commands to control the device in response to determining whether a message has been received from the SIM interface.

9. The system 16 of claim 8, wherein the message is a text message.

10. The system of claim 1, wherein the SIM interface is configured to receive additional executable instructions from a network for updating the instructions of the SIM, and
    wherein the SIM interface is configured to communicate the additional executable instructions to the SIM.

11. The system of claim 1, wherein the SIM interface comprises a processor configured to communicate the commands from the SIM to control the device.

12. The system of claim 1, wherein the SIM interface comprises an input/output (I/O) module configured to communicate the commands from the SIM to control the device.

13. The system of claim 12, comprising lines communicatively connecting the I/O module and the device.

14. The system of claim 12, comprising lines communicatively connecting the I/O module and the SIM.

15. The system of claim 12, wherein the SIM interface is communicatively coupled to the SIM via a cellular network.

16. The system of claim 1, wherein the executable instructions comprise computer-executable instructions.

17. A method comprising:
    at a SIM, executing one or more executable instructions to generate one or more commands for controlling a device;
    at a SIM interface, receiving the one or more commands for controlling the device, and communicating the one or more commands to the device for controlling the device;
    wherein the one or more executable instructions at the SIM comprise one or more executable instructions for determining whether a message has been received from the SIM interface, and
    executing the one or more executable instructions for determining whether the message has been received from the SIM interface for controlling the device.

18. The method of claim 17, wherein the device is an M2M device.

19. The method of claim 17, comprising providing power to the SIM at predetermined intervals.

20. The method of claim 17, wherein the message is a text message.

21. The method of claim 17, comprising executing the one or more executable instructions to generate the one or more commands to control the device in response to executing the executable instruction for determining a registration status of the SIM interface.

22. The method of claim 21, wherein the message is a text message.

23. The method of claim 17, comprising receiving additional executable instructions from a network for updating the instructions of the SIM, and communicating the additional executable instructions to the SIM.

24. The method of claim 17, wherein the executable instructions comprise computer-executable instructions.

* * * * *